United States Patent [19]
Schneuing et al.

[11] Patent Number: 5,480,020
[45] Date of Patent: Jan. 2, 1996

[54] HANGING DEVICE FOR A HANGING CONVEYOR

[75] Inventors: Ralf Schneuing; Paul Janzen, both of Bielefeld, Germany

[73] Assignee: Dürkopp Adler Aktiengesellschaft, Bielefeld, Germany

[21] Appl. No.: 277,958

[22] Filed: Jul. 20, 1994

[30]     Foreign Application Priority Data

Jul. 21, 1993 [DE] Germany .................... 43 24 426.2

[51] Int. Cl.⁶ .................................................. B65G 37/00
[52] U.S. Cl. ........................................ 198/465.4; 198/680
[58] Field of Search ................... 198/46.54, 680, 198/360, 687.1, 485.1, 486.1

[56]         References Cited
           U.S. PATENT DOCUMENTS

| | | | |
|---|---|---|---|
| 4,909,373 | 3/1990 | Geerts | 198/465.4 X |
| 5,113,998 | 5/1992 | Grube et al. | 198/465.4 |
| 5,143,201 | 9/1992 | Speckhart et al. | 198/465.4 X |

*Primary Examiner*—Joseph E. Valenza
*Attorney, Agent, or Firm*—Ostrolenk, Faber, Gerb & Soffen

[57]         ABSTRACT

A hanging device for use in a hanging conveyor for receiving the hook of a clothes hanger is adapted to open for the release and/or ejection of the clothes hanger. It has a frame-shaped body and a flap pivotally fastened therein, the frame-shaped body having, in its rear region, a slot which permits the ejection of the hook. With such a hanging device it is possible to load clothes hangers from both sides, even while the conveyor is moving at a high speed.

12 Claims, 4 Drawing Sheets

5,480,020

HANGING DEVICE FOR A HANGING CONVEYOR

BACKGROUND OF THE INVENTION

1. Field of the Invention

The present invention relates to a hanging device for a hanging conveyor. It relates more particularly to a hanging device for a hanging conveyor for receiving the hook of a clothes hanger, the device being openable in order to release or eject the clothes hanger, and having a body and a flap which is fastened to the body for pivoting around an axis extending at right angles to the direction of transport, the hook of the clothes hanger during transport lying on a bevel formed on the body and resting against the flap which during transport remains closed.

2. Description of the Related Art

Such a hanging device is disclosed in U.S. Pat. No. 5,113,998 and Federal Republic of Germany Cl 39 09 002. A large number of such hanging devices are fastened to the drive chain of the hanging conveyor and serve, for instance, to receive the hook of a clothes hanger in order to transport the article of clothing hanging on it to a given destination, for example for storage or to be worked upon.

Ordinarily the hanging devices pass along a loading station which is arranged beside the conveyor path, and one hanger at a time is automatically transferred to a hanging device at the loading station. At the intended destination of the article of clothing, each hanging device is opened and the hanger is ejected or otherwise transferred out of the hanging device.

In order to introduce articles of clothing into a circular conveyor, the articles must already be in the proper transfer position before the hanging device arrives at the loading station where they are to be picked up. The clothes hanger and the hanging device can be combined only at a given moment. Dependable loading is possible only from the front, referred to the direction of travel, of the hanging device. It follows from this that the clothes hanger must be catapulted with high speed into the waiting position and it must also be kept from colliding with goods already traveling in the hanging conveyor.

Since introduction is possible only within a very short period of time, despite the fact that each hanger is in a parking position in front of the hanging device corresponding to it, it is necessary for the hanger to be accelerated to a considerably greater speed than the speed of the conveyor chain, and then abruptly braked. The strong acceleration leads to wear of the loading station, to the hanger jumping out of the hanging device, or to the article of clothing falling off the hanger.

Furthermore, the known hanging device is closed on one side parallel to the direction of transport, so that the clothes hangers can be loaded only from one side.

SUMMARY OF THE INVENTION

The object of the invention is to develop the hanging device in such a manner that it is possible to load the hooks of clothes hangers from both sides, and furthermore to develop it in such a manner that dependable transfer is possible even at high speeds.

This object is achieved by the features set forth herein. According to an important aspect of the invention, the body is developed in the form of a frame which is open from both sides, the frame having a slot which permits the ejection of the hook, the slot being provided in the rear region with respect to the direction of transport.

Due to the frame-like development of the body, the hanger hooks can be loaded into the hanging device from both sides. Because only a narrow slot is provided for the ejection of the hook in the rear region, the frame is almost closed so that a high degree of stability is obtained.

The compact construction of the frame permits automatic handling, even in the case of very small hook openings and short hanger hooks.

If the length of the body is substantially greater than its width, the hanging device requires a correspondingly long time to pass the place of transfer. Thus, more time is available for the transfer of the clothes hanger. The longer the part of the body which catches the hanger hook upon the transfer, the longer the time of transfer which can be tolerated.

Following the transfer station, in the transport direction, there is provided a stripping station which then moves the hanger hook, if it is not yet in its rearward transport position, into said position. This can be effected, for instance, by brushes which pass on both sides along the lower part of the body and brush against the hanger hook to move it back toward the flap which is arranged in the rear part of the body. However, it is also conceivable to provide the conveyor with an upwardly sloping path following the transfer station so that the hanger hooks slide back to the flap.

Further, a slot-shaped recess is provided in the rear part of the body, extending upward from the slot, which provides limits for both the open position of the flap and the closed position of the flap. This recess can serve as a stop surface for engaging a corresponding extension which is provided on the flap.

Other features and advantages of the present invention will become apparent from the following description of the invention which refers to the accompanying drawings.

BRIEF DESCRIPTION OF THE DRAWINGS

The invention will be described in further detail below with reference to the drawings, in which.

DETAILED DESCRIPTION OF AN EMBODIMENT OF THE INVENTION

Figure 1:
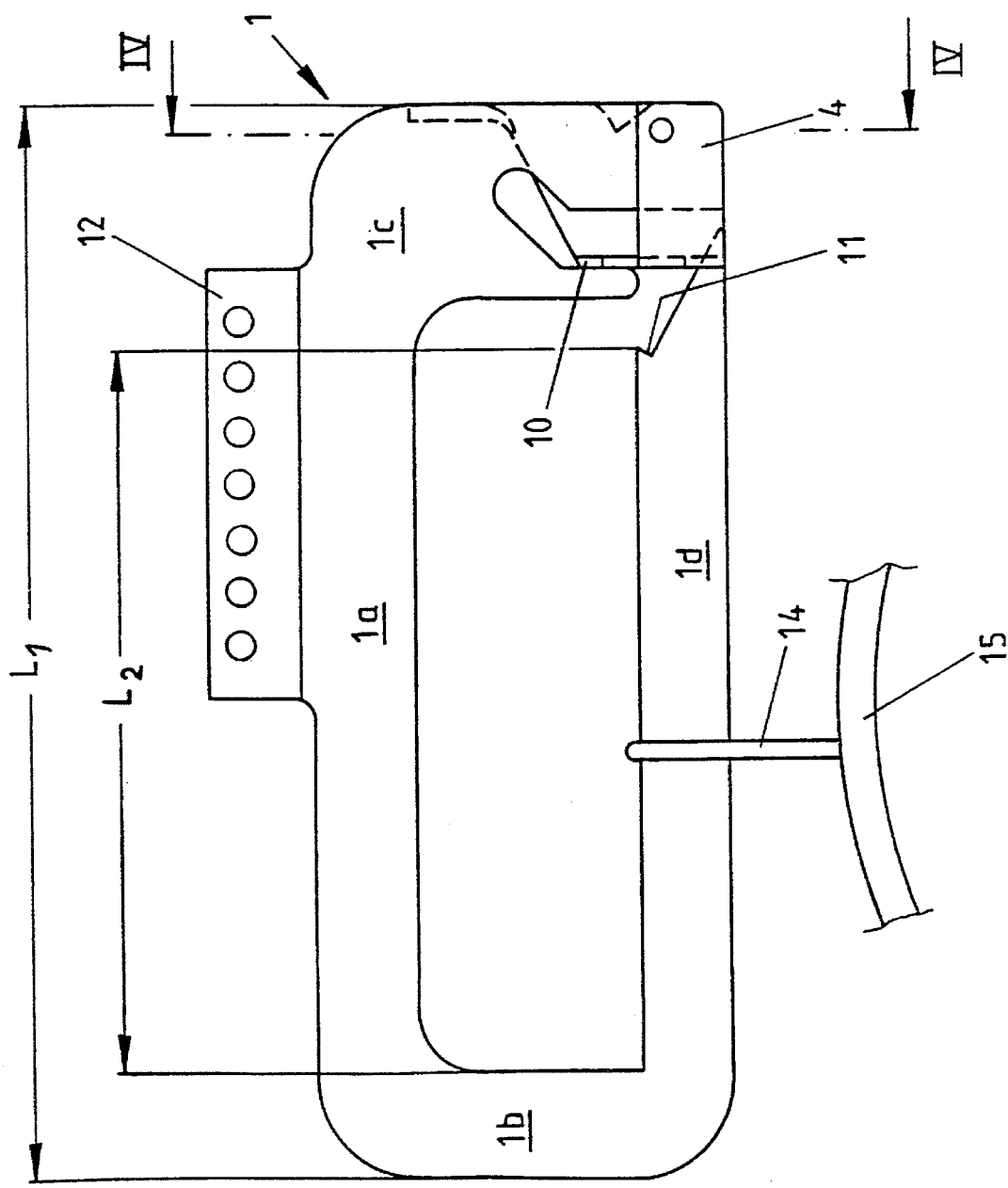
FIG. 1 shows the hanging device with the clothes hanger just loaded.
Figure 2:
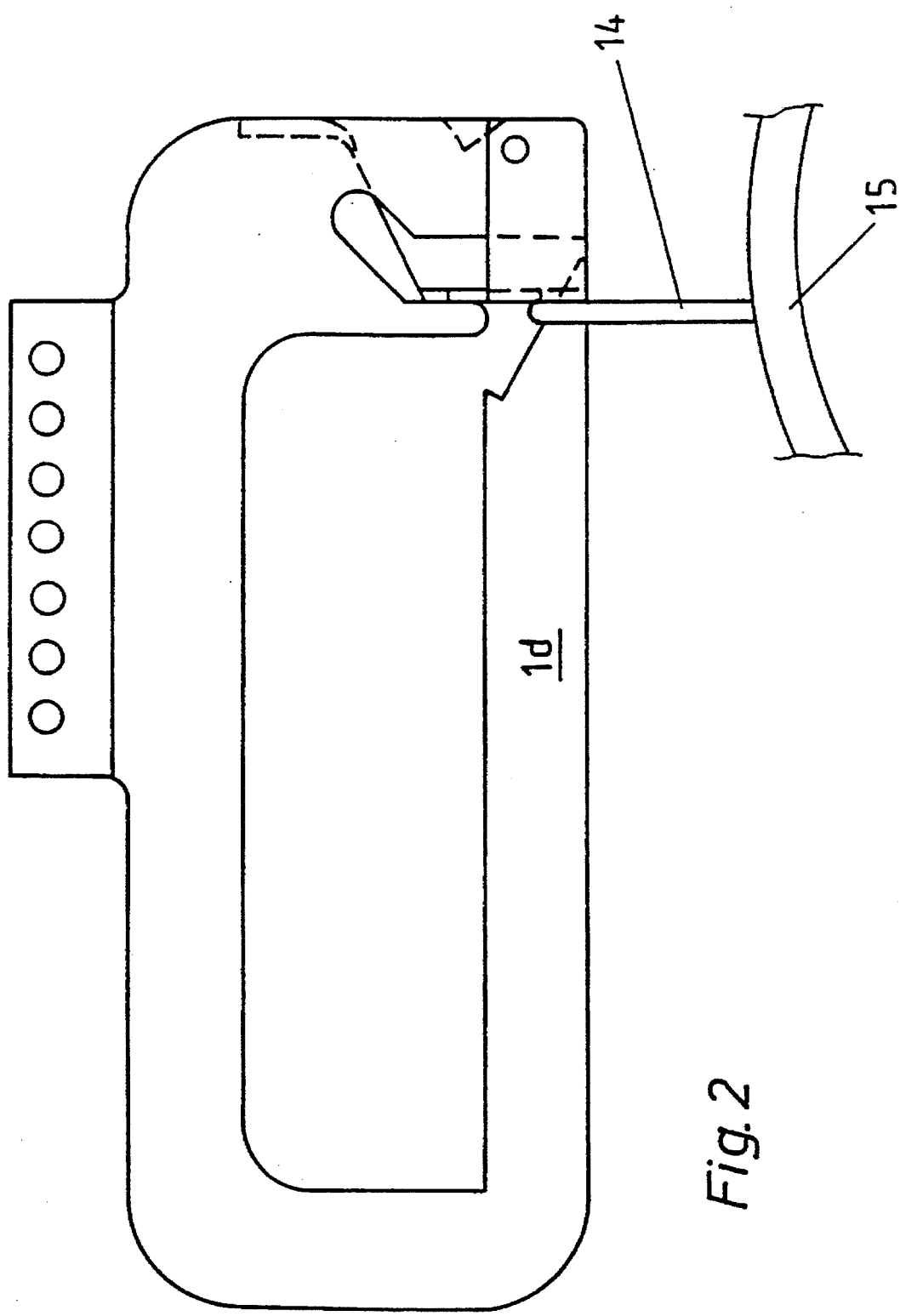
FIG. 2 shows the hanging device of FIG. 1 with the clothes hanger in the position of transport.
Figure 3:
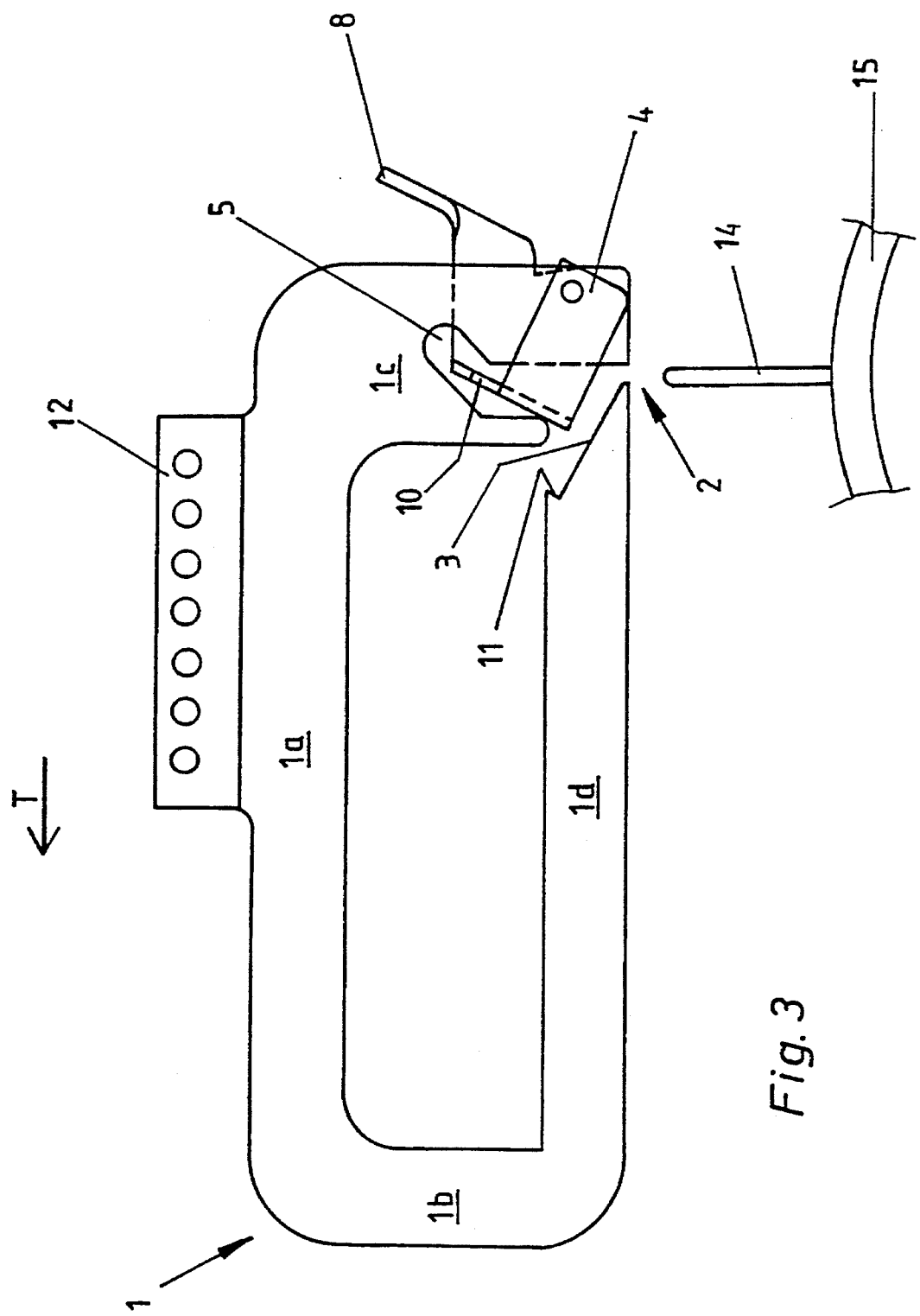
FIG. 3 shows the ejection of the clothes hanger from the hanging device.

The hanging device comprises a body 1, developed in the form of a frame which is formed of the upper part 1a, the front part 1b, the rear part 1c, and the lower part 1d. See FIG. 1. The frame formed in this manner is interrupted only by a slot 2, (FIG. 3) which serves for the ejection of the hanger hook 14 and hanger 15. The slot is of such width that the hanger hook can dependably slide down from the bevel 3 formed on the lower part 1d and then drop out, without jamming.

Figure 4:
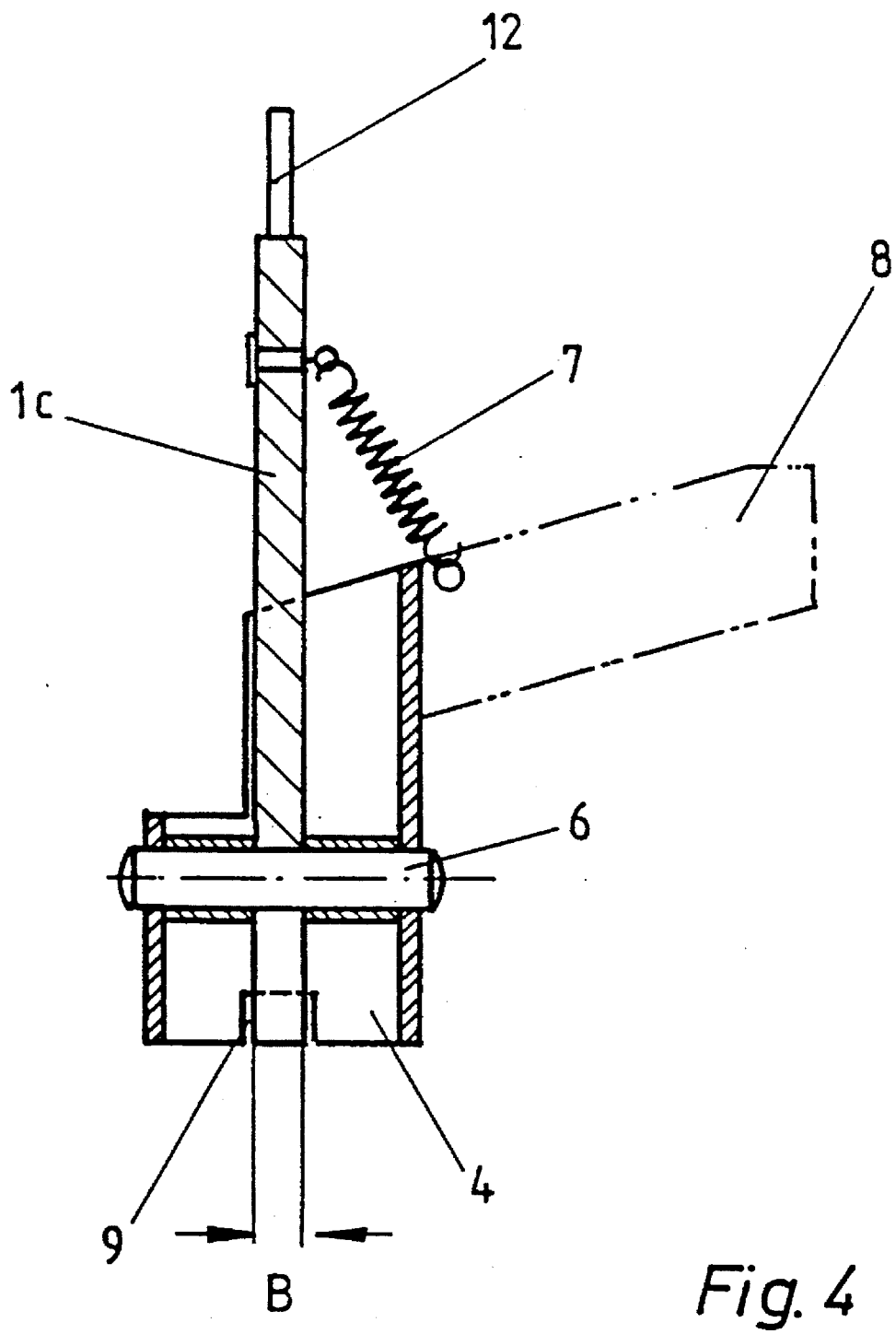
FIG. 4 is a cross-sectional view taken along the line IV—IV of FIG. 1.

At the rear part 1c, the flap 4 is pivotably attached by means of a mounting pin 6. The front part of the flap is moved into a recess 5 by the pivoting movement. The vertically extending recess 5 opens in its lower region into the slot 2 and ends in its upper region in an extended section which is bent off towards the rear at an angle with respect to the vertical. On the side of the flap 4 there is provided a wing 8 which can be engaged by a device—not shown—for opening the flap 4. On the front side of the flap 4 there is an extension 10 which serves as a stop against the edge formed by the recess 5 in the rear part 1c. This extension 10 limits both the fully open position and the closed position of the flap 4. Furthermore, the flap 4 has a rectangular recess 9 (FIG. 4) which lies over the bevel 3 without contacting it, when the flap 4 is closed.

For closing the flap 4 a tension spring 7 is attached to the wing 8 and to the body 1. See FIG. 4.

Referring again to FIG. 1, on the upper part 1a of the body 1 there is an attachment interface 12 which is developed so that it can engage conventional fastening devices on the conveyor chain.

The transition from the lower part 1d to the front part 1b inside the body 1 is effected by a right angle. In this way, the result is obtained that the longest possible length $L_2$ is available for transferring the hanger hook 14 into the hanging device.

As can clearly be noted from the drawings, the length $L_1$ (FIG. 1) is substantially greater than the width B (FIG. 4) of the body 1. In one embodiment, a length of $L_1$ of 200 mm and a width of 55 mm were selected, which gave good results.

More generally, the length $L_1$ of 200 mm has been found to be desirable to obtain reliable transfer of hangers, given the usual relative speeds of known conveyors and loading stations.

Further, the length $L_1$ of the body 1 is advantageously at least 10 times its width. Since a conventional hanger hook is usually 40 mm in diameter, the width B of a hanging device should be no more than approximately 20 mm, or half the diameter of the hanger hook, in order to ensure reliable retention of a hanger on the hanging device. In the embodiment described above, an even narrower hanging device, 55 mm in width, was found to give good results.

The length $L_2$ is of the same order of magnitude as the length $L_1$. As shown, $L_2$ may be about $2/3$ of $L_1$, but may be a greater fraction of $L_1$, depending on the dimensions of the front and rear parts 1b and 1d. It follows that the length $L_2$ should be at least 6–10 times the width of the hanging device, for the same reasons.

The greater the inner length $L_2$ of the lower part 1d, the longer the time which is available for the transfer of the clothes hanger 15. The clothes hanger 15 is transferred into the hanging device by a transfer device, not shown in detail, at some time while said device is passing the transfer station. Depending on the point in time when the transfer occurs, the hanger 15 or hanger hook 14 drops onto some part of the horizontally extending top side of the lower part 1d.

A stationary stripping device (not shown), which is arranged behind the transfer position in the direction of transport T, then engages the hanger hook 14, and as a result of the further transport of the hanger device, pushes it backwards to the front of the bevel 3, from which it slides into its transport position in front of the closed flap 4.

A shoulder 11, provided at the transition from the horizontal top edge of the lower part 1d to the bevel 3, prevents the hanger hook 14 from being pushed out of its transport position, which would prevent a dependable delivery of the hanger at the intended place.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hanging device for a hanging conveyor for receiving a hook of a clothes hanger, the device being openable in order to release or eject the clothes hanger, the hanging device comprising:

a body having a length and a width formed as a frame open on both sides for receiving the clothes hanger from either side, the length of the body being greater than the width of the body by a factor of at least 10;

a bevel formed on the body;

a slot in the body, the slot permitting ejection of the hook and being provided in a rear region of the body with respect to a direction of transport; and a flap fastened to the body for pivoting around an axis extending transverse to the direction of transport, the hook of the clothes hanger during transport lying on the bevel formed on the body and resting against the flap which during transport remains closed.

2. A hanging device for a hanging conveyor for receiving a hook of a clothes hanger, the device being openable in order to release or eject the clothes hanger, the hanging device comprising:

a body provided in the form of an open frame having a length and a width, the length being greater than the width by a factor of at least 10, a bevel being formed on the body;

a slot in the body, the slot permitting ejection of the hook and being provided in a rear region of the body with respect to a direction of transport; and a flap fastened to the body for pivoting around an axis extending transverse to the direction of transport, the hook of the clothes hanger during transport lying on the bevel formed on the body and resting against the flap which during transport remains closed.

3. A hanging device according to claim 2, wherein the length of the body is greater than the width thereof by a factor of about 40.

4. A hanging device according to claim 2, wherein a length of a lower frame part of the body which receives the hook is at least about 6–10 times greater than the width of the body thereof.

5. A hanging device for a hanging conveyor for receiving a hook of a clothes hanger, the device being openable in order to release or eject the clothes hanger, the hanging device comprising:

a body having a width, the body being provided in the form of an open frame, the open frame having a lower frame part having a length, wherein the length of the lower frame part of the body which receives the hook is at least about 6–10 times greater than the width of the body;

a slot in the body, the slot permitting ejection of the hook and being provided in a rear region of the body with respect to a direction of transport; and a flap fastened to the body for pivoting around an axis extending transverse to the direction of transport, the hook of the clothes hanger during transport lying on a bevel formed on the body and resting against the flap which during transport remains closed.

6. A hanging device for a hanging conveyor for receiving a hook of a clothes hanger, the device being openable in order to release or eject the clothes hanger, the hanging device comprising:

a body provided in the form of an open frame, the frame including a rear part, the rear part having a recess formed therein;

a slot in the body, the slot permitting ejection of the hook and being provided in a rear region of the body with respect to a direction of transport; and a flap fastened to the body for pivoting around an axis extending transverse to the direction of transport, the hook of the clothes hanger during transport lying on a bevel formed on the body and resting against the flap which during transport remains closed, the flap is received in the recess formed in the rear part of the body, the recess extends in a vertical direction for receiving the flap and serves to limit a fully open position of the flap.

7. A hanging device according to claim 6, wherein the flap has an extension which rests against a front side of the recess when the flap is closed.

8. A hanging device according to claim 7, wherein the engagement of the recess and the extension prevents contact between the flap and the bevel.

9. A hanging device according to claim 6, wherein the recess opens into the slot.

10. A hanging device according to claim 9, wherein the recess first extends upward from the slot and then angles rearward at a height corresponding to the extension on the flap.

11. A hanging device according to claim 10, wherein the flap has an extension which rests against a rear side of the recess when the flap is open.

12. A hanging device for a hanging conveyor for receiving a hook of a clothes hanger, the device being openable in order to release or eject the clothes hanger, the hanging device comprising:

a body provided in the form of an open frame, the body having a lower part and a front part, a transition from an inner edge of the lower part to an inner edge of the front part of the body is effected at substantially a right angle;

a slot in the body, the slot permitting ejection of the hook and being provided in a rear region of the body with respect to a direction of transport; and a flap fastened to the body for pivoting around an axis extending transverse to the direction of transport, the hook of the clothes hanger during transport lying on a bevel formed on the body and resting against the flap which during transport remains closed.

* * * * *